(12) United States Patent
Citrin

(10) Patent No.: US 10,377,541 B1
(45) Date of Patent: Aug. 13, 2019

(54) ILLUMINATED LIQUID CONTAINER CAP WITH ROCKER DISPENSING MECHANISM

(71) Applicant: Adam J. Citrin, Sandy Springs, GA (US)

(72) Inventor: Adam J. Citrin, Sandy Springs, GA (US)

(*) Notice: Subject to any disclaimer, the term of this patent is extended or adjusted under 35 U.S.C. 154(b) by 10 days.

(21) Appl. No.: 15/351,407

(22) Filed: Nov. 14, 2016

Related U.S. Application Data

(63) Continuation of application No. 14/886,350, filed on Oct. 19, 2015, now Pat. No. 9,493,267, which is a continuation-in-part of application No. 13/936,497, filed on Jul. 8, 2013, now Pat. No. 9,163,826.

(60) Provisional application No. 61/668,583, filed on Jul. 6, 2012.

(51) Int. Cl.
| | |
|---|---|
| B65D 51/24 | (2006.01) |
| F21L 4/00 | (2006.01) |
| F21V 23/04 | (2006.01) |
| F21V 23/06 | (2006.01) |
| F21V 33/00 | (2006.01) |
| H05B 37/02 | (2006.01) |
| B65D 1/02 | (2006.01) |
| B65D 41/04 | (2006.01) |
| B65D 47/06 | (2006.01) |

(52) U.S. Cl.
CPC ............ *B65D 51/245* (2013.01); *B65D 1/02* (2013.01); *B65D 41/04* (2013.01); *B65D 47/06* (2013.01); *F21L 4/00* (2013.01); *F21V 23/04* (2013.01); *F21V 23/0464* (2013.01); *F21V 23/0492* (2013.01); *F21V 23/06* (2013.01); *F21V 33/0004* (2013.01); *H05B 37/0227* (2013.01); *H05B 37/0272* (2013.01); *H05B 37/0281* (2013.01)

(58) Field of Classification Search
CPC .. B65D 1/02; B65D 2583/0427; B65D 23/14; B65D 51/248; B65D 39/0082; A47G 19/2227; A47G 2019/2238; F21S 10/0002
See application file for complete search history.

(56) References Cited

U.S. PATENT DOCUMENTS

| | | | |
|---|---|---|---|
| 1,793,160 A | 2/1931 | Coughlin | |
| 2,547,450 A | 4/1951 | DuPont | |
| 5,505,349 A | 4/1996 | Peckels | |
| 6,254,247 B1 | 7/2001 | Carson | |
| 6,454,432 B1 * | 9/2002 | Avinger | A45C 1/12 362/154 |
| 6,742,678 B1 | 6/2004 | Krystopik, Jr. | |
| 6,758,308 B1 | 7/2004 | Hearting et al. | |
| 7,422,339 B2 | 9/2008 | Jordan | |
| 7,954,970 B2 | 6/2011 | Goldburt | |
| 8,011,816 B1 | 9/2011 | Janda | |
| 8,662,696 B2 | 3/2014 | Lederer et al. | |

(Continued)

OTHER PUBLICATIONS

Office Action dated Jan. 15, 2015 in U.S. Appl. No. 13/936,497.

(Continued)

*Primary Examiner* — Robert J May

(57) ABSTRACT

Embodiments of an illuminated liquid container are disclosed herein. The illuminated liquid container can include a light source that, when activated, emits light, and a switch that activates the light source. Some embodiments of the illuminated liquid container include a bottle for holding a liquid and a cap through which the liquid can be passed.

20 Claims, 7 Drawing Sheets

(56) References Cited

U.S. PATENT DOCUMENTS

| | | | |
|---|---|---|---|
| 9,010,952 B2* | 4/2015 | Lenahan | B65D 23/102 |
| | | | 222/113 |
| 9,821,937 B2* | 11/2017 | Staeben | F21V 33/004 |
| 2001/0032655 A1 | 10/2001 | Gindi | |
| 2005/0056663 A1 | 3/2005 | Yu | |
| 2005/0068502 A1 | 3/2005 | Mau | |
| 2006/0250784 A1 | 11/2006 | Langone | |
| 2006/0283882 A1 | 12/2006 | Escobar | |
| 2007/0206372 A1 | 9/2007 | Casillas | |
| 2008/0272147 A1 | 11/2008 | Buker | |
| 2011/0188229 A1* | 8/2011 | Rizo Hernandez | B65D 51/248 |
| | | | 362/86 |
| 2013/0032610 A1 | 2/2013 | Muller | |
| 2014/0300273 A1 | 10/2014 | LeBrun | |

OTHER PUBLICATIONS

Notice of Allowance dated Jun. 1, 2015 in U.S. Appl. No. 13/936,497.
Office Action dated Dec. 31, 2015 in U.S. Appl. No. 14/886,350.
Notice of allowance dated Jul. 21, 2016 in U.S. Appl. No. 14/886,350.

* cited by examiner

ILLUMINATED LIQUID CONTAINER CAP WITH ROCKER DISPENSING MECHANISM

CROSS-REFERENCE TO RELATED APPLICATIONS

This application is a continuation of and claims priority to U.S. patent application Ser. No. 14/886,350, entitled "Illuminated Liquid Container and Illuminated Container Cap," filed on Oct. 19, 2015, now U.S. Pat. No. 9,493,267, which is incorporated herein by reference in its entirety; and which is a continuation-in-part of and claims priority to U.S. patent application Ser. No. 13/936,497, entitled "Illuminated Liquid Container," filed on Jul. 8, 2013, now U.S. Pat. No. 9,163,826, which is incorporated herein by reference in its entirety; and which claims priority to U.S. Provisional Patent Application No. 61/668,583, entitled "Illuminated Liquid Dispenser," filed on Jul. 6, 2012, which is incorporated herein by reference in its entirety.

BACKGROUND

Unless otherwise indicated herein, the materials described in this section are not prior art to the claims in this application and are not admitted to be prior art by inclusion in this section.

Liquids are sometimes packaged and sold in dispenser packages for various purposes and applications. For example, motor oil, vehicle and/or machine lubricants, personal lubricants, creams and/or lotions, soaps and/or shampoos, and the like are sometimes sold in dispenser packages. In some cases, for example, a bottle or other package can be sold with a pump to dispense a liquid. In some other cases, a nozzle or other opening can be formed in the dispenser package to allow consumers to apply the liquid to a desired location or surface by applying pressure to walls of the dispenser package.

Some liquids that are sold in dispenser packages, however, may be sold for low-light applications. For example, transmission fluid stabilizers, motor oil additives, personal lubricants, or the like, may be applied in low-light conditions. For example, when adding a transmission fluid stabilizer to a transmission, a mechanic or other entity may add the stabilizer to the transmission via a pipe that holds a dipstick, or the like. Similarly, consumers may apply personal lubricants in low-light or no-light conditions that make it difficult to identify the target surface and/or to determine how much liquid has been applied. In some conditions, the lack of ambient lighting may be advantageous and/or desired, and as such these dispenser packages may be considered to be sufficient for their intended purposes.

SUMMARY

Concepts and technologies are disclosed herein for an illuminated liquid container or dispenser package. In some embodiments, an illuminated liquid container contains a fluid such as motor oil, motor lubricants, fluid additives such as stabilizers, personal lubricants, lotions, creams, or the like. The illuminated liquid container can include a light source. In some embodiments, the light source can include a light emitting device such as a bulb, a light emitting diode ("LED"), an organic light emitting diode ("OLED") material or lighting panel, a chemoluminescent material or fluid, and/or other light emitting materials or structures. The light source can be incorporated into an illuminated liquid container or other dispensing package. In some embodiments, the light source can be formed as a part of an illuminated liquid container, and in some other embodiments, the light source can be retrofitted to an existing liquid container or other dispensing package as a part of a cap or other structure.

The illuminated liquid container can include a switch for activating and/or deactivating the light source, particularly in embodiments of the illuminated liquid container that use an electrical or electronic light source such as an LED, an OLED, a light bulb, or the like. In some embodiments, the switch can be provided by a standard electrical switch such as a rocker switch, or the like. In some embodiments, the switch can include a single pole, single throw switch for activating/deactivating the light source. In some other embodiments, the switch can include a multiple pole and/or multiple throw switch for applying different voltages or currents to the light switch, for controlling multiple light sources, and/or combinations thereof. As such, some embodiments of the concepts and technologies described herein can include multiple light sources and/or operating states. For example, the light source can include one or more light sources having one or more colors, one or more intensities, and/or one or more operating states such as solid, blinking, or the like.

Furthermore, some embodiments of the concepts and technologies described herein can include various components for activating and/or deactivating the light switch in addition to, or instead of, a mechanical switch. For example, some embodiments of the concepts and technologies described herein include switches that automatically activate/deactivate the light source when the dispensing container is opened, tilted, or the like. Thus, some embodiments of the concepts and technologies described herein include a cap that includes a nozzle that, when opened by a user, activates the light source. It should be understood that this example is illustrative and therefore should not be construed as being limiting in any way.

In still other embodiments, the illuminated liquid container includes multiple components for controlling the light switch. For example, in addition to, or instead of, a manual switch and/or an automatic switch for activating/deactivating the light source, some embodiments of the concepts and technologies described herein include photo sensors for deactivating the light source in light conditions, even if a manual or automatic switch is activated. Additionally, or alternatively, some embodiments of the concepts and technologies described herein include use of an orientation sensor to determine if the dispensing package is tilted into an application position. If the package is not tilted into an application position, the light source may not be activated. Thus, some embodiments of the concepts and technologies described herein may include an orientation sensor, for example an accelerometer or the like, as an override for the switch and/or photo sensor.

Additionally, some embodiments of the concepts and technologies described herein can include relays and/or timers for deactivating the light source after a particular time period. Some example time periods can include, for example, one second, five seconds, ten seconds, twenty seconds, thirty seconds, one minute, one hour, one day, or the like. Thus, some embodiments of the concepts and technologies described herein can be configured to increase battery life of the illuminated liquid container. It should be understood that these examples are illustrative and therefore should not be construed as being limiting in any way.

In some embodiments, the light source can be located at the bottom of the illuminated liquid container. Thus, the light source can be configured to illuminate a liquid inside the illuminated liquid container, the illuminated liquid container itself, and/or a surface to which the liquid is applied. According to various embodiments, the illuminated liquid container is illuminated and/or illuminates the liquid by passing light through the liquid that is being dispensed via refraction of the light through the liquid itself. Thus, in some embodiments, the illumination source can illuminate the site at which the liquid is being applied by passing light through the liquid via refraction. Thus, for example, a lubricant such as oil, personal lubricants, or the like coming out of the illuminated liquid container can refract light through the liquid itself and thereby illuminate the application site.

In some other embodiments, wherein the liquid is clear or translucent, the illumination source can be directed or aimed toward the application site, and the light emitted by the illumination source can pass through the liquid without refraction and/or reflection. It should be understood that these examples are illustrative and therefore should not be construed as being limiting in any way.

In some embodiments, an inside surface of one or more portions of the illuminated liquid container can be coated with a reflective coating and/or otherwise formed to reflect light emitted by the illumination source toward the application site. Similarly, reflection can be used to intensify the effect of the light within the liquid, including in embodiments wherein the liquid refracts and/or reflects light to illuminate the application site.

In some embodiments, the illuminated liquid container can be formed with the light source located in or at the cap or nozzle. Thus, some embodiments of the concepts and technologies described herein can illuminate the liquid dispensed by the illuminated liquid container and/or the surface to which the fluid is applied without passing light through the liquid. In some embodiments, the illuminated liquid container can be configured to refract or direct light without passing the light through the liquid, if desired. It should be understood that these examples are illustrative and therefore should not be construed as being limiting in any way.

According to one aspect of the concepts and technologies described herein, an illuminated liquid container is disclosed. The illuminated liquid container can include a light source. When the light source is activated, the light source can emit light. The illuminated liquid container further can include a switch that can be used to activate the light source.

According to some embodiments, the illuminated liquid container can include a bottle that contains a liquid. The light can pass through the liquid to illuminate a surface to which the liquid is applied. The light source can be located in a cap. The cap can include a passageway, and the light source can be connected to the switch by electrical connections. In some embodiments, the illuminated liquid container further can include an orientation sensor that deactivates the light source unless the illuminated liquid container is tilted into an application position.

In some embodiments, the illuminated liquid container further can include a photocell that deactivates the light source unless a low light condition exists at the illuminated liquid container. The illuminated liquid container also can include a battery that provides an electrical charge to the light source, and the battery can be controlled by the switch. In some embodiments, the light source and the switch can be located at a first end of the bottle, a cap can include a passageway and can be located at a second end of the bottle, and the light source can be aimed toward the second end of the bottle.

In some embodiments, the illuminated liquid container can include an illumination column. The illumination column can include an empty space within the bottle. The illumination column can enable the light to illuminate the passageway from within the bottle. In some embodiments, the liquid can include a personal lubricant. In some embodiments, the liquid can include an additive for one liquid selected from the group consisting of motor oil and transmission fluid. In some embodiments, the illuminated liquid container further can include a nozzle, and the nozzle can be configured to refract light emitted by the light source to direct the light toward an application end of the nozzle.

In some embodiments, the illuminated liquid container further can include a bottle that contains a liquid, a battery that provides an electrical charge to the light source, and a cap can include a passageway, wherein the cap is configured to engage a portion of the bottle. The light source can be located at a first end of the bottle, the switch can be located at the first end of the bottle, the light source can be located at the first end of the bottle, the cap can be located at a second end of the bottle, and the light source can be aimed toward the second end of the bottle and can be configured to illuminate a surface to which the liquid is applied via refraction of the light through the liquid.

In some embodiments, the illuminated liquid container further can include a photocell. In some embodiments, the illuminated liquid container further can include an orientation sensor that detects when the illuminated liquid container is tilted. In some embodiments, the orientation sensor includes an accelerometer. In some embodiments, the illuminated liquid container can include a controller that activates the light source based upon input from at least one of the switch, a photocell, or an orientation sensor, and at least one of a relay or a timer that is used to deactivate the light source after a predefined time period passes when the light source is activated.

According to another aspect of the concepts and technologies described herein, another illuminated liquid container is disclosed. The illuminated liquid container can include a bottle configured to hold a liquid, and a cap can include a passageway through which the liquid is passed to dispense the liquid. The cap can be configured to engage a portion of the bottle. The illuminated liquid container further can include a light source that, when activated, emits light for illuminating a surface to which the liquid is applied, a switch that activates the light source, and a battery that provides an electrical charge to the light source.

According to yet another aspect of the concepts and technologies described herein, another illuminated liquid container is disclosed. The illuminated liquid container can include a bottle configured to hold a lubricant and a cap can include a passageway through which the lubricant is passed to dispense the lubricant. The cap can be configured to engage a portion of the bottle. The illuminated liquid container further can include a light source that, when activated, emits light for illuminating a surface to which the lubricant is applied, a switch that activates the light source, and a battery that provides an electrical charge to the light source.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
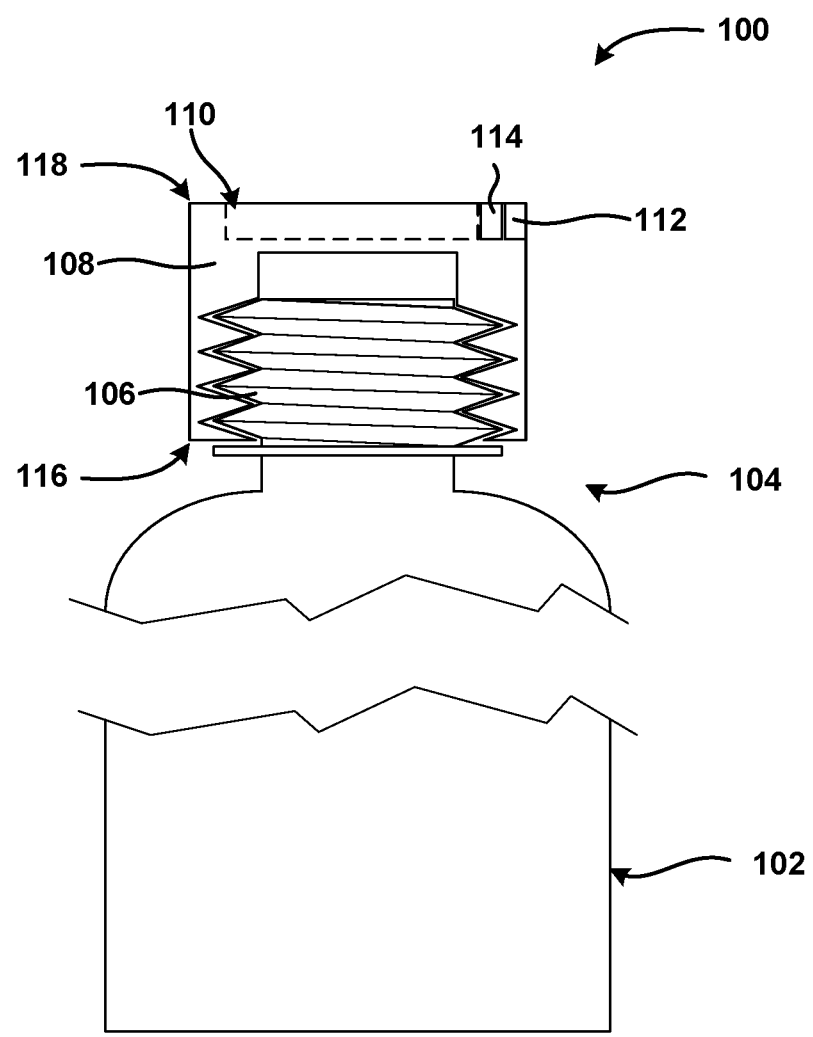
FIG. 1 is a line drawing illustrating an illuminated liquid container, according to an illustrative embodiment of the concepts and technologies described herein.

The following detailed description is directed to an illuminated liquid container or dispenser. In some embodiments, an illuminated liquid container contains a fluid. The illuminated liquid container can include a light source. The light source can be incorporated into the illuminated liquid container and/or a portion thereof such as a bottle or a cap. In some embodiments, the light source can be included in an illuminated liquid container, and in some embodiments, the light source can be included in a cap or other structure that can be retrofitted to an existing liquid container or other dispensing package.

The illuminated liquid container can include a switch for activating and/or deactivating the light source. The functionality of the switch can be provided by an electrical switch, a photocell, an orientation sensor, and/or a combination thereof. Activation of the switch and/or other hardware such as photocells, orientation sensors, or the like, can result in activation of the light source. Thus, the illuminated liquid container can be activated to illuminate the liquid and/or a surface to which the liquid is applied. These and other embodiments of the concepts and technologies described herein will be illustrated and described in detail below.

In the following detailed description, references are made to the accompanying drawings that form a part hereof, and in which are shown by way of illustration specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The word "illustrative," as used in the specification, is used expansively to refer to embodiments that serve as an illustration, specimen, model or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure.

Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of illuminated liquid containers will be presented.

Turning to FIG. 1, an illustrative embodiment of an illuminated liquid container 100 will be described. In some embodiments, as shown in FIG. 1, the illuminated liquid container 100 disclosed herein can include a container portion such as a bottle, a diaphragm, a box, or the like ("bottle") 102. The bottle 102 can have any desired shape and is not limited to the embodiments shown in the FIGURES.

As in FIG. 1, the bottle 102 can include and/or can be coupled to an outlet end 104, which can include a threaded outlet portion 106. In particular, the outlet end 104 can have a threaded outer diameter having threads that can engage a threaded inner diameter (or threads) of a cap or cover ("cap") 108. As such, an illuminated liquid container 100 as disclosed herein can have two components, a bottle 102 or other liquid container portion (e.g., a bottle or the like), and a cap 108 or other cover, which can include a passageway 110 through which a liquid held by the bottle 102 passes during dispensing. In some embodiments, threads on the cap 108 and reciprocal threads on the bottle 102 can be replaced with other connection mechanisms such as, for example, pressure fits, reciprocal detents and/or indents, pins or other mechanical fasteners, chemical fasteners, or the like. Of course, the illuminated liquid container 100 can be formed from one piece of material and/or multiple pieces that can be assembled and/or permanently bonded together during assembly, if desired.

In the illustrated embodiment, the cap 108 includes a nozzle or other passageway 110 through which liquid held by the bottle 102 passes. The passageway 110 can include a rotating cap portion that is pivotally attached to the cap 108, whereby opening the passageway 110 can unseal the illuminated liquid container 100, as is sometimes used with shampoo bottles, or the like. In the illustrated embodiment, the cap 108 can also include an electrical or mechanical switch 112. The switch 112 can be activated or deactivated to activate or deactivate a light source 114 such as an LED, a light bulb, combinations thereof, or the like. Thus, although not visible in FIG. 1, it should be understood that the switch 112 can be electrically connected to the light source 114. Furthermore, it should be understood that the light source 114 and/or the switch 112 can be electrically connected to a battery that can provide a power source for the light source 114. In the illustrated embodiment, the light source 114 includes one or more LEDs, light bulbs, and/or other illumination sources. As shown in FIG. 1, in various embodiments of the cap 108, the threads or other connection mechanisms (that engage the threaded outlet portion 106 of the bottle 102) can be located at a first end 116 of the cap 108 (e.g., the end closest to the bottle 102 when the cap 108 is engaged to the bottle 102), and the light source 114 can be located at a second end 118 of the cap 108. The light source 114 can be oriented such that the light is emitted away from the first end 116 of the cap 108 (e.g., the light from the light source 114 can illumine an application surface outside of the cap 108 and the bottle 102). It should be understood that this example is illustrative and therefore should not be construed as being limiting in any way.

Figure 2:
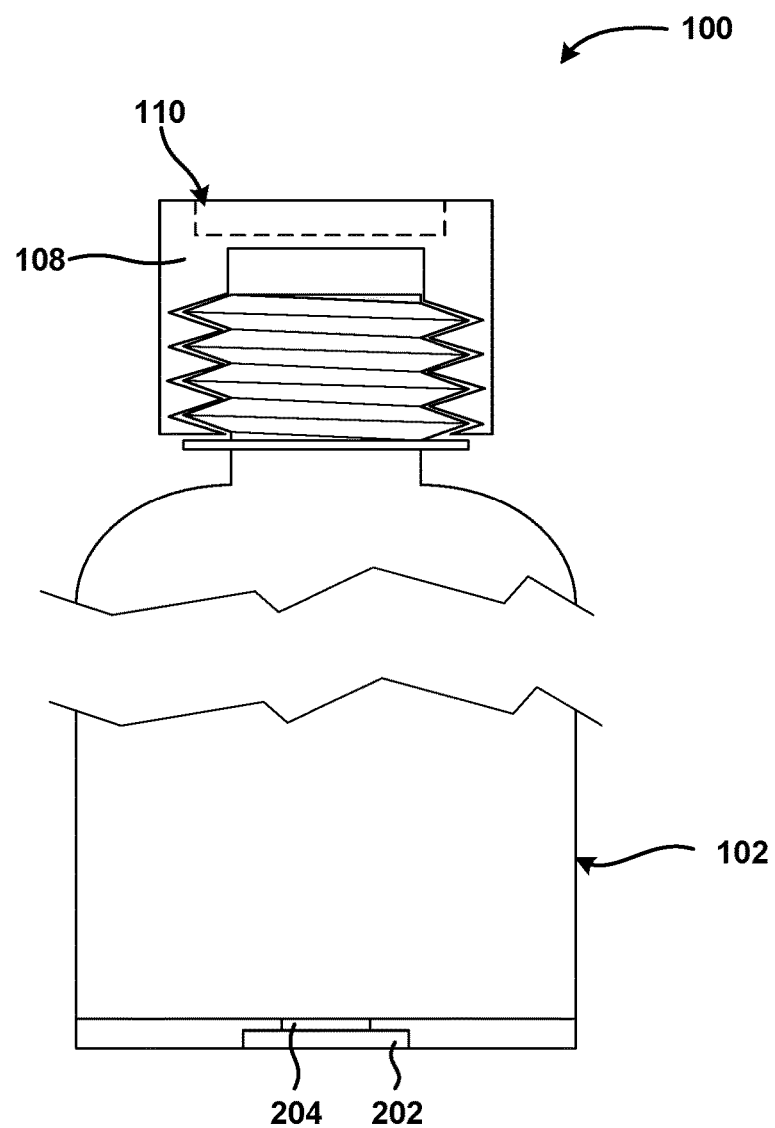
FIG. 2 is a line drawing illustrating an illuminated liquid container, according to another illustrative embodiment of the concepts and technologies described herein.

Turning now to FIG. 2, another embodiment of the illuminated liquid container 100 will be described. In FIG. 2, the cap 108 can omit the switch 112 and/or the light source 114. In the embodiment shown in FIG. 2, the bottle 102 can include a switch 202, which can be located at the base of the bottle 102. The switch 202 can include a mechanical switch as described herein for manually activating and/or deactivating a light source 204. In some embodiments, the switch 202 can include a pressure switch that is configured to activate the light source 204 when the illuminated liquid container 100 is picked up or otherwise lifted off of a support surface such as a table, or the like. It should be understood that this example is illustrative and therefore should not be construed as being limiting in any way.

In the embodiment shown in FIG. 2, light emitted by the light source 204 can be aimed or directed toward the passageway 110. Thus, light emitted by the light source 204 may pass through a liquid located in the bottle 102 and/or may be directed toward the passageway 110 without passing through the liquid in the bottle 102. Thus, the light may be refracted by the liquid in the bottle 102, by the bottle 102 itself, and/or may not be refracted. Furthermore, some embodiments of the concepts and technologies described herein include a reflective coating on the inside surface of the bottle 102, which can be used to reflect the light toward the passageway. It should be understood that this example is illustrative and therefore should not be construed as being limiting in any way.

Figure 3:
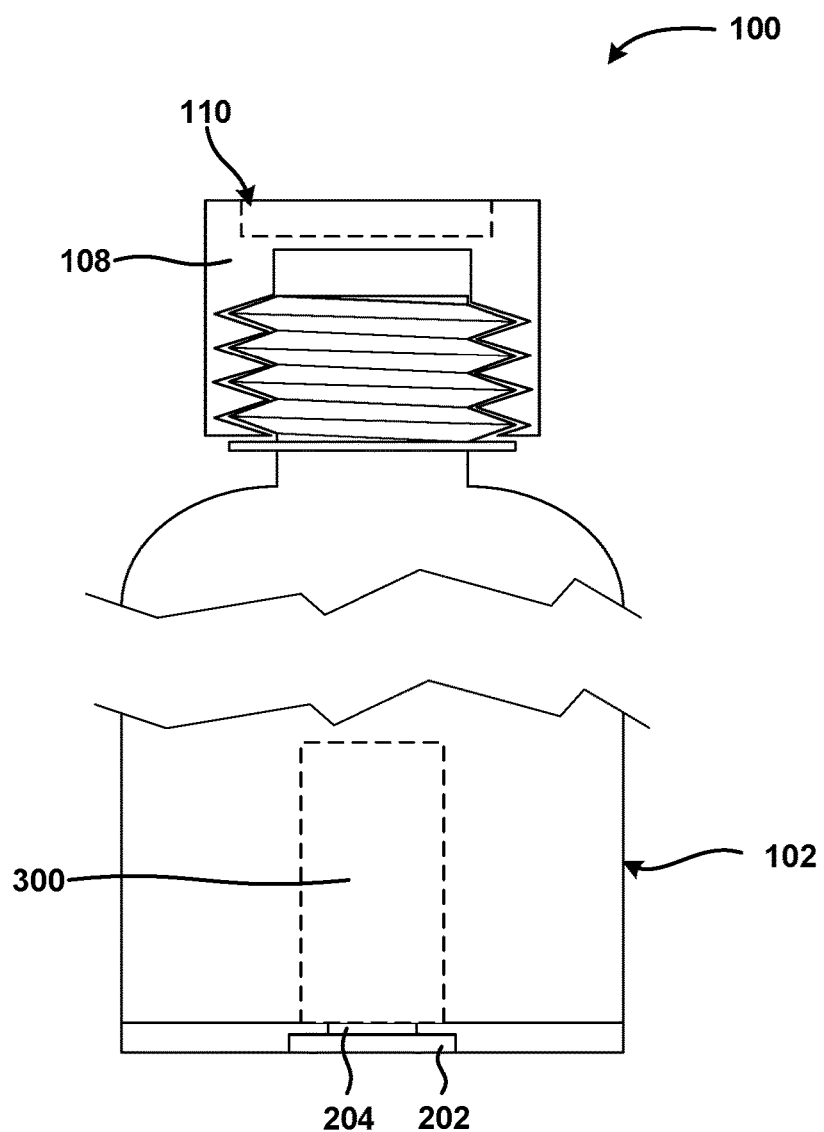
FIG. 3 is a line drawing illustrating an illuminated liquid container, according to yet another illustrative embodiment of the concepts and technologies described herein.

Turning now to FIG. 3, additional aspects of the concepts and technologies described herein for an illuminated liquid container will be described in detail. In some embodiments, as shown in FIG. 3, the illuminated liquid container 100 can include an illumination column 300. The illumination column 300 can be used to encourage and/or enable passage of light through the liquid in the bottle 102. The illumination column 300 may be included in some embodiments, for example the illumination column 300 may be particularly useful where the liquid in the bottle 102 is thick and/or dark-colored. Thus, use of the illumination column 300 with liquids that are dark and/or minimally translucent may be useful by reducing the amount of the liquid through which the light passes before exiting the illuminated liquid container 100 at the passageway 110 of the illuminated liquid container 100.

Figure 4:
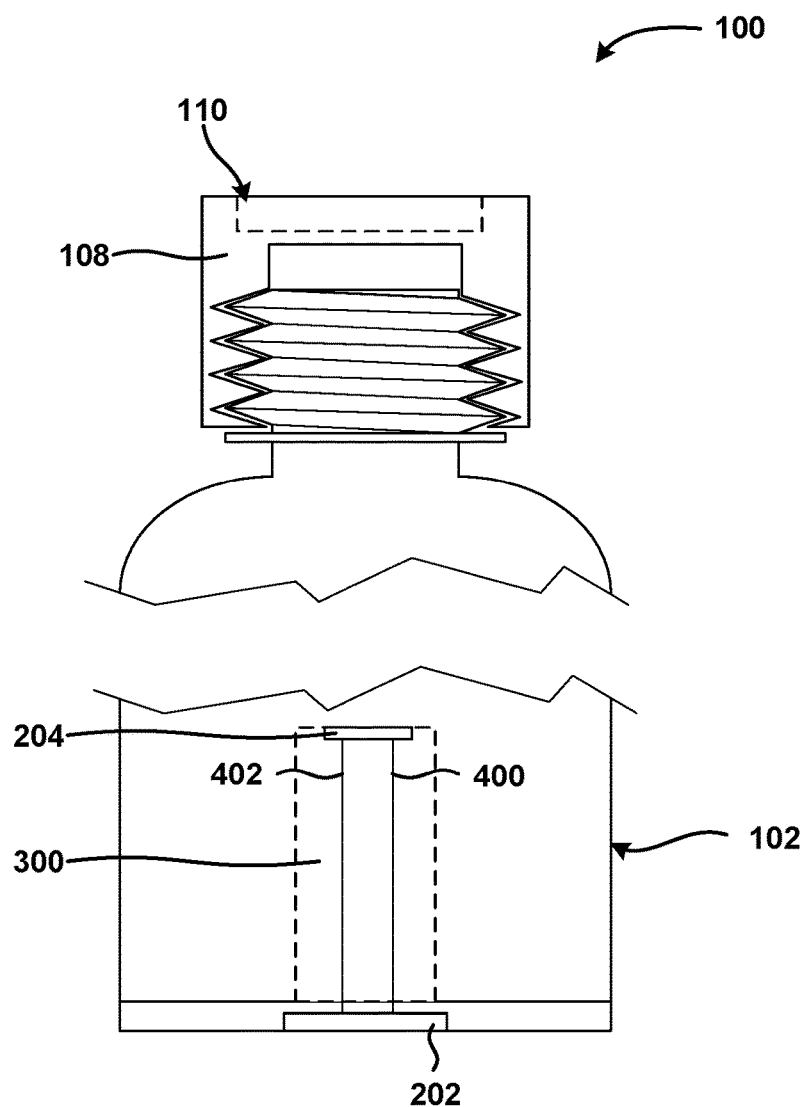
FIG. 4 is a line drawing illustrating an illuminated liquid container, according to yet another illustrative embodiment of the concepts and technologies described herein.

In some embodiments, the column is formed as a hollow cylinder of plastic, glass, acrylic, or the like, and a light source 204 can be located at one end of the illumination column 300, at more than one location within the illumination column 300, and/or elsewhere within the illuminated liquid container. In the embodiment illustrated in FIG. 3, the light source 204 is illustrated at the bottom of the illumination column 300. In the embodiment shown in FIG. 4, the light source 204 is illustrated at the top of the illumination column 300. As shown in FIG. 4, the light source 204 can be connected to the switch 202 and/or a battery or other power source (not shown) via electrical contacts 400, 402. It should be understood that this example is illustrative and therefore should not be construed as being limiting in any way.

Figure 5:
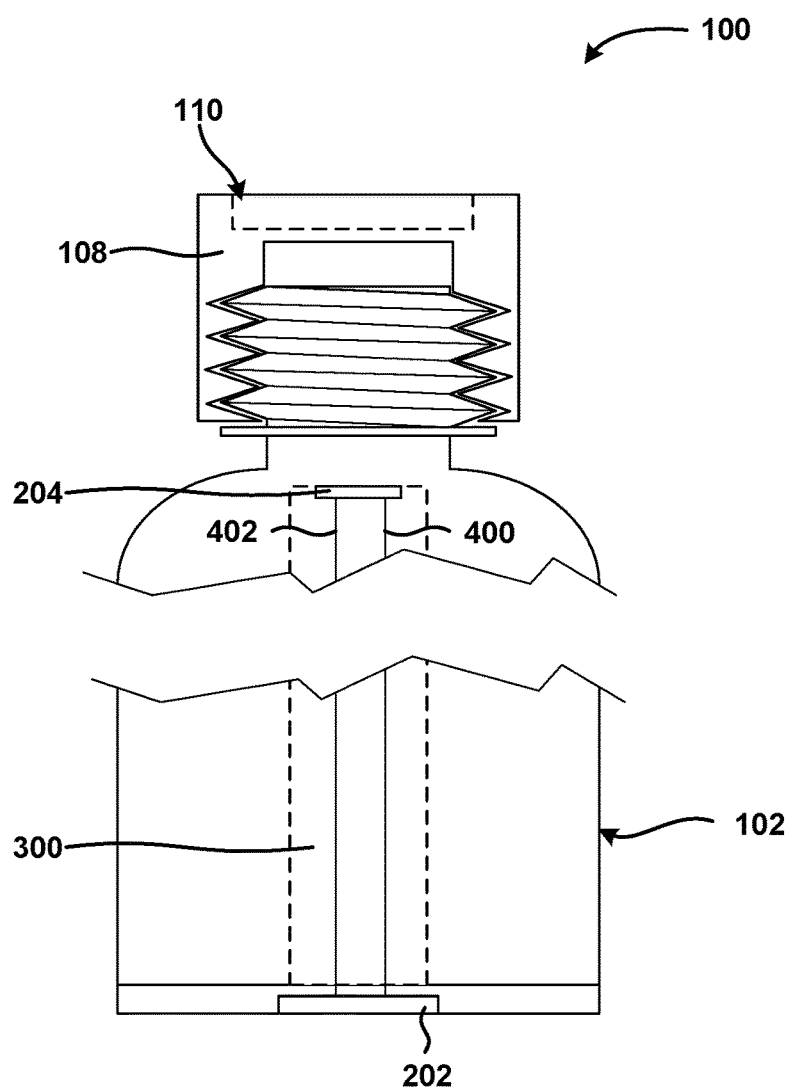
FIG. 5 is a line drawing illustrating an illuminated liquid container, according to yet another illustrative embodiment of the concepts and technologies described herein.

Turning now to FIG. 5, additional aspects of the concepts and technologies described herein for an illuminated liquid container will be described in detail. In the embodiment shown in FIG. 5, the light source 204 is illustrated at the top of the illumination column 300. As shown in FIG. 5, the light source 204 can be connected to the switch 202 and/or a battery or other power source (not shown) via electrical contacts 400, 402. In the embodiment shown in FIG. 5, the illumination column 300 extends from the bottom of the bottle 102 toward the top or substantially to the top of the bottle 102. Thus, the illumination column 300 may terminate at a location that is proximate to an outlet end of the illuminated liquid container 100. Thus, the light source 204 can be located at a top of the illumination column 300 as shown in FIG. 5, or at a bottom of the illumination column 300 as shown in FIG. 3 and aimed through the illumination column 300 from the bottom of the illuminated liquid container 100. Thus, various embodiments of the concepts and technologies described herein can support actual and/or effective placement of the light source 204 at or near a dispensing end of the illuminated liquid container 100.

Although not visible in FIGS. 3-5, it should be understood that the illumination column 300 can include reflective coatings, lenses, and/or other structures or coatings that can be used to intensify, focus, and/or aim light emitted by the light source 204 toward or to a dispensing end of the illuminated liquid container. It should be understood that these examples are illustrative and therefore should not be construed as being limiting in any way.

The bottle 102 or other container portion of the illuminated liquid container 100 can be formed from almost any type of material. For example, the bottle 102 can be formed from various plastics or other polymers such as, for example, plastics, thermoplastics, glasses, acrylics, composites, polymers, metals, woods, combinations thereof, or the like. The cap 108 of the illuminated liquid container 100 can be formed from a clear or translucent material. The cap also can be formed from an opaque material, if desired. In some embodiments, a dispensing end of the cap 108 can be clear or translucent to allow the light emitted by the light source 114/204 to illuminate a site at which the liquid is applied. The cap 108 can be formed from various materials and/or combinations thereof including, but not limited to, plastics, thermoplastics, glasses, acrylics, composites, polymers, metals, woods, combinations thereof, or the like.

In some embodiments, the dispensing end of the container has a rocker type dispensing structure and/or a switch for activating the device, which can be located at the dispensing end of the container as noted above with reference to FIG. 1. Thus, in some embodiments the light source can be located at the dispensing end or cap of the illuminated liquid container 100. Thus, the lighting device portion of the illuminated liquid container 100 can include and/or can function as the dispensing device for the illuminated liquid container 100. In some embodiments, activation of the light source 114/204 can be effected by rocking of the dispensing structure. Thus, some embodiments of the illuminated liquid container 100 can be configured to activate the light source 114/204 when the dispensing container is opened, and as such, some embodiments of the illuminated liquid container 100 can omit a dedicated switch such as the switch 112/202 for activating/deactivating the light source 114/204. It should be understood that these examples are illustrative and therefore should not be construed as being limiting in any way.

In some other embodiments, a switch for activating the illumination device can be located at the bottom of the illuminated liquid container 100 with the light source 204 as shown in FIGS. 2-5. Thus, the light source 204 can be activated by various means. For example, the light source 204 can include a rocker switch, an on-off switch, a pressure switch, a twist mechanism for activating/deactivating the light source 204, or the like, as well as photocells, orientation sensors, or the like for activating and/or deactivating the light source 204. In some embodiments, the light source 114/204, the switch 112/202, power sources and/or other circuitry and/or logic for providing the functionality disclosed herein can be located in the cap 108. As such, the cap 108 can be moved from and/or among various bottles such as the bottle 102. Thus, the functionality described herein for an illuminated liquid container can be provided by the cap 108 and need not be included with a bottle 102 and/or other liquid-containing structure. It also should be understood that the light source 114/204 can be located in the cap 108 and aimed at an application site, and as such, the light emitted by the light source 114/204 need not pass through the liquid and/or the illuminated liquid container 100. It should be understood that these examples are illustrative and therefore should not be construed as being limiting in any way.

Figure 6:
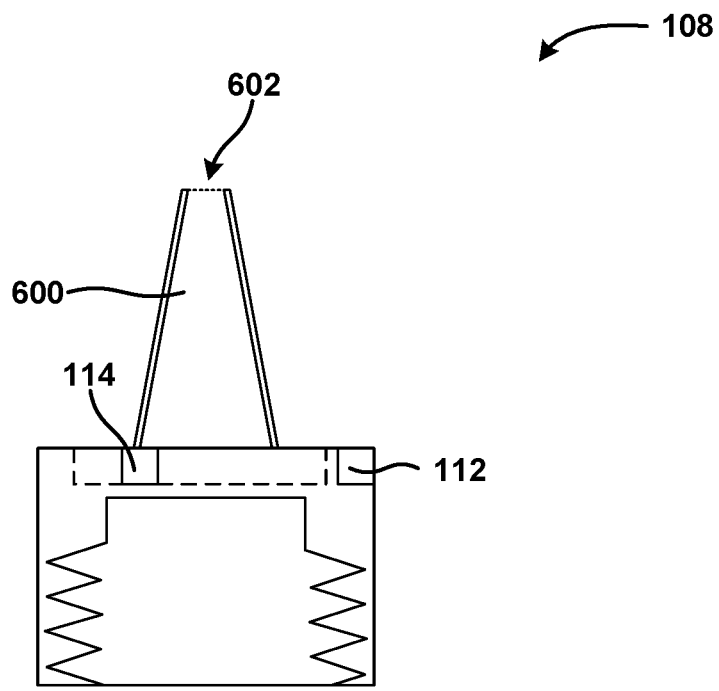
FIG. 6 is a line drawing illustrating an illuminated liquid container, according to yet another illustrative embodiment of the concepts and technologies described herein.
Figure 7:
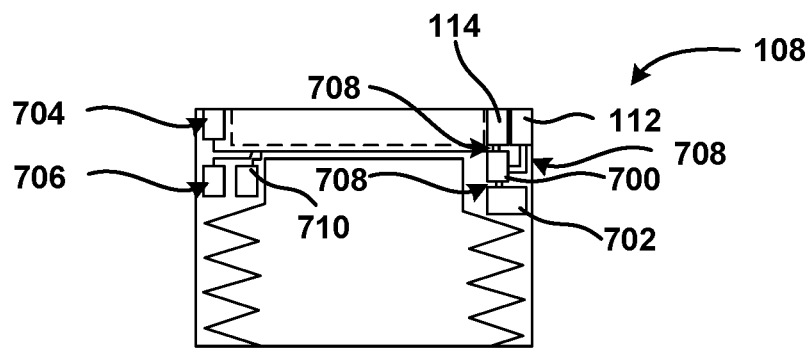
FIG. 7 is a line drawing illustrating an illuminated liquid container, according to yet another illustrative embodiment of the concepts and technologies described herein.

Turning to FIGS. 6-7, additional aspects of the concepts and technologies described herein for an illuminated liquid container are illustrated and described in additional detail. As shown in FIG. 6, another embodiment of the cap 108 is shown. The cap 108 can include a nozzle 600. The nozzle 600 can be formed from a clear, translucent, and/or opaque material. In some embodiments, the nozzle 600 is formed from clear or translucent material (and/or includes a layer of a clear or translucent material) that is configured to refract light emitted by a light source 114 toward an application end 602 of the nozzle 600. In the illustrated embodiment, the nozzle is formed from a clear or translucent material that is painted with an opaque paint or film and as such, light emitted by the light source 114 is only visible at the application end 602 of the nozzle 600. It should be understood that this example is illustrative and therefore should not be construed as being limiting in any way.

Turning to FIG. 7, some embodiments of the cap 108 include the switch 112, the light source 114, a controller 700, a battery 702, a photo sensor, photocell, and/or other light sensor ("photocell") 704, and/or an orientation sensor 706. These and other components of the cap 108 can be connected to one another by various electrical contacts 708. It should be understood that these examples are illustrative and therefore should not be construed as being limiting in any way.

In various embodiments of the concepts and technologies described herein, light emitted by the various light sources 114/204 can be colored for various effects, for example, for low light conditions. Thus, the light can be red, for example. The light also can be blue, green, yellow, white, purple, and/or almost any other desired color or combination of colors. In some embodiments, for example, the light source 114/204 can be configured to cycle colors, to pulse on and/or off, or the like. In one contemplated embodiment, the light device is incorporated into a personal lubricant container, and the light is cycled and/or pulsed through various colors for desired effects. It should be understood that this embodiment is illustrative, and should not be construed as being limiting in any way.

The dispensing device can include a nozzle for precision aiming of the liquid and the illumination device can be within the cap and refracted and/or reflected into or through the nozzle itself. For example, the dispensing end and the nozzle can be formed from a material that can refract light and aims the light toward the area at which the liquid is being dispensed. An example of this is shown in FIG. 6.

Combinations of the various embodiments disclosed herein are contemplated and are possible. For example, in some embodiments the switch for the illumination device is located at the bottom of the dispensing containers and the illumination device is located at the top, or vice versa. In some embodiments, the bottle itself is illuminated and ambient light generated by the illumination device can be used to illuminate the area at which the liquid is applied instead of aiming or directing the light to or through the liquid of dispensing end. Thus liquids can be aimed in dark environments or dark places without using an external light source. All embodiments can be combined, if desired, and/or interchanged with one another.

Figure 8:
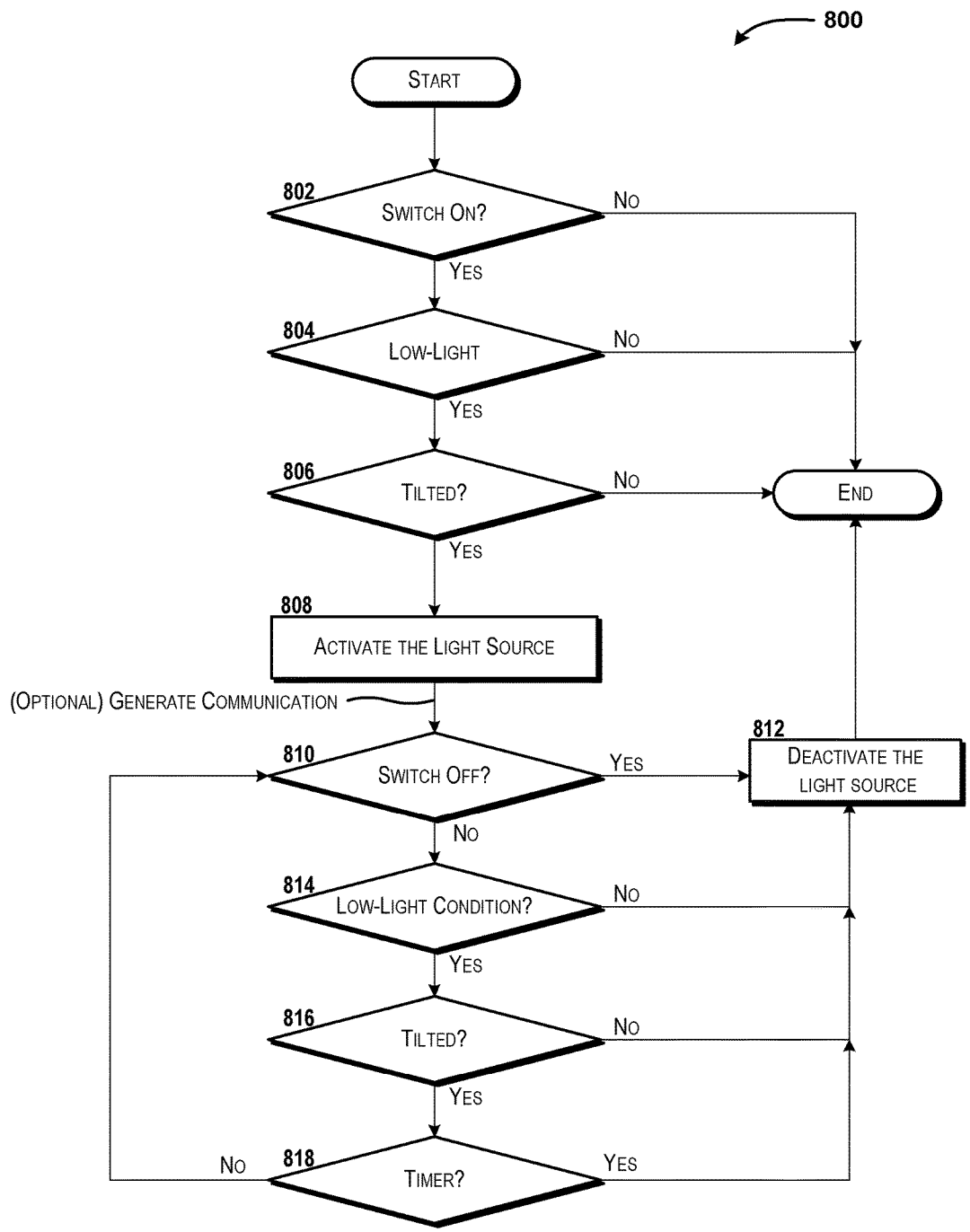
FIG. 8 is a flow diagram illustrating aspects of a method for activating and/or deactivating a light source of an illuminated liquid container, according to an illustrative embodiment of the concepts and technologies described herein.

Turning now to FIG. 8, additional aspects of embodiments of the concepts and technologies described herein for an illuminated liquid container are described. In particular, FIG. 8 illustrates aspects of a logic flow and/or method 800 for controlling a light source 114/204 using a controller, a lighting control module, and/or other logic according to an illustrative embodiment. It should be understood that the operations of the method 800 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method 800 disclosed herein can be ended at any time and need not be performed in its entirety. Some or all operations of the method 800, and/or substantially equivalent operations, can be performed by execution of computer-readable instructions included on a computer storage media instead of, or in addition to, a logic or controller as discussed herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within a computing system and/or other hardware such as the cap 108 disclosed herein. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, by electrical/mechanical logic, and/or combination thereof. For purposes of illustrating and describing one contemplated embodiment of the illuminated liquid container, operations of the method 800 are described as being performed by the controller 700. It should be understood that this example is illustrative and therefore should not be construed as being limiting in any way.

Flow of the method 800 begins at operation 802, wherein the controller 700 determines if a switch is on or off. It should be understood that the controller 700 may not truly "determine" that the switch is on or off. Rather, the logic flow illustrated by the method 800 may be initiated by powering of the logic by turning the switch on. Because it is possible for processor and memory to provide the operations illustrated and described in FIG. 8, it should be understood that the controller 700 may actually determine if the switch is on or off, in some embodiments. According to various embodiments, the controller 700 can include one or more processors, logic circuits, and/or other structures that can perform operations.

If the controller 700 determines, in operation 802, that the switch is not on, flow of the method 800 can end. If the controller 700 determines, in operation 802, that the switch is on, flow of the method 800 can proceed to operation 804.

In operation 804, the controller 700 can determine if a low-light condition exists at the bottle 102 and/or the illuminated liquid container 100. In some embodiments, the controller 700 can determine, for example, that a photocell 704 (if included) is true or false. According to some embodiments, the photocell 704 can be considered true if the photocell 704 is activated. In some other embodiments, the photocell 704 can be considered true if the photocell 704 is deactivated. In other words, the controller 700 can consider the photocell 704 to be on or off in low-light conditions (though the photocell 704 may in actuality be deactivated in low-light conditions). If the controller 700 determines, in operation 804, that a low-light condition does not exist at the bottle 102 and/or the illuminated liquid container 100, e.g., that a high-light or other than low-light condition exists, flow of the method 800 can end. If the controller 700 determines, in operation 804, that a low-light condition exists, flow of the method 800 can proceed to operation 806.

In operation 806, the controller 700 can determine if the bottle 102 and/or the illuminated liquid container 100 is tilted. According to some embodiments, the controller 700 can determine that the bottle 102 and/or the illuminated liquid container 100 is tilted based upon a reading and/or state associated with an orientation sensor 706 or other device. If the controller 700 determines, in operation 806, that the bottle 102 and/or the illuminated liquid container 100 is not tilted, flow of the method 800 can end. If the controller 700 determines, in operation 806, that the bottle 102 and/or the illuminated liquid container 100 is tilted, flow of the method 800 can proceed to operation 808.

Based upon the above description of the various embodiments of the concepts and technologies described herein, it should be understood that operations 802, 804, and/or 806 can be omitted in various embodiments. Thus, some embodiments of the illuminated liquid container 100 may include only a switch 112/202, only a photocell 704, and/or only an orientation sensor 706. Some other embodiments of the concepts and technologies described herein include two or more of the switch 112/202, the photocell 704, and the orientation sensor 706. As such, the method 800 can omit zero, one, or two of the operations 802-806. It should be understood that this example is illustrative and therefore should not be construed as being limiting in any way.

In operation 808, the controller 700 can activate the light source 114/204. In some embodiments, the controller 700 can be configured to start a counter or timer when the light source 114/204 is activated. In some other embodiments, activation of the light source 114/204 can trigger a relay. It should be understood that this example is illustrative and therefore should not be construed as being limiting in any way. From operation 808, flow of the method 800 can proceed to operation 810.

In some embodiments, the controller 700 can generate a communication at operation 808, at operation 810, between operations 808 and 810, and/or at other times. As explained below, the communication can indicate that the illuminated liquid container 100 has been used. This communication can include an alert, a notification, and/or other type of communication, and can be used for compliance tracking, for billing purposes (e.g., tracking use of an ointment or medication in the illuminated liquid container 100), generating social networking updates (e.g., indicating use of the illuminated liquid container 100), tracking other activities (as explained below), combinations thereof, or the like. Because the communication described herein may not be generated and/or because the communication may be generated at almost any time, it should be understood that the illustrated embodiment is illustrative and therefore should not be construed as being limiting in any way.

In operation 810, the controller 700 can determine if the switch 112/202 is turned off. If the controller 700 determines, in operation 810, that the switch is turned off, flow of the method 800 can proceed to operation 812. In operation 812, the light source 114/204 can be deactivated and flow of the method 800 can end. If the controller 700 determines, in operation 810, that the switch is not turned off, flow of the method 800 can proceed to operation 814.

In operation 814, the controller 700 can determine if a low light condition exists at the bottle 102 and/or the illuminated liquid container 100. In some embodiments, the controller 700 can determine, for example, that a photocell 704 (if included) is true or false. According to some embodiments, the photocell 704 can be considered true if the photocell 704 is activated. In some other embodiments, the photocell 704 can be considered true if the photocell 704 is deactivated. In other words, the controller 700 can consider the photocell 704 to be on or off in low-light conditions (though the photocell 704 may in actuality be deactivated in low-light conditions). If the controller 700 determines, in operation 814, that a low-light condition does not exist at the bottle 102 and/or the illuminated liquid container 100, e.g., that a high-light or other than low-light condition exists, flow of the method 800 can proceed to operation 812, wherein the light source 112/202 is deactivated, and flow of the method 800 can end. If the controller 700 determines, in operation 814, that the low-light condition exists, flow of the method 800 can proceed to operation 816.

In operation 816, the controller 700 can determine if the bottle 102 and/or the illuminated liquid container 100 is tilted. According to some embodiments, the controller 700 can determine that the bottle 102 and/or the illuminated liquid container 100 is tilted based upon a reading and/or state of an orientation sensor 706. If the controller 700 determines, in operation 816, that the bottle 102 and/or the illuminated liquid container 100 is not tilted, flow of the method 800 can proceed to operation 812, wherein the light source 112/202 can be deactivated and flow of the method 800 can end. If the controller 700 determines, in operation 816, that the bottle 102 and/or the illuminated liquid container 100 is tilted, flow of the method 800 can proceed to operation 818.

In operation 818, the controller 700 can determine if a timer or relay has expired. If the controller 700 determines, in operation 818, that the timer or relay has expired, flow of the method 800 can proceed to operation 812, wherein the light source 112/202 can be deactivated and flow of the method 800 can end. If the controller 700 determines, in operation 818, that the timer or relay has not expired, flow of the method 800 can return to operation 810. Thus, execution of the method 800 can repeat until the controller 700 determines, in any iteration of operations 810-818, that a condition for deactivating the light source 112/202 is satisfied. It should be understood that these examples are illustrative and therefore should not be construed as being limiting in any way.

Based upon the above description of the various embodiments of the concepts and technologies described herein, it should be understood that one or more of the operations 810-818 can be omitted in various embodiments. Thus, some embodiments of the illuminated liquid container 100 may include only a switch 112/202, only a photocell 704, and/or only an orientation sensor 706, and may include and/or omit a timer or relay. Some other embodiments of the concepts and technologies described herein include two or more of the switch 112/202, the photocell 704, the orientation sensor 706, and/or the timer/relay (which can be provided by logic and/or programs included in the controller 700, if desired). As such, the method 800 can omit zero, one, two, and/or three of the operations 810-818. It should be understood that this example is illustrative and therefore should not be construed as being limiting in any way.

Although not visible in the drawings, it should be understood that some embodiments of the concepts and technologies described herein include various power sources such as inductance coils for charging a battery or capacitor when the illuminated liquid container 100 is moved, one or more solar cells for charging a batter or capacitor when the illuminated liquid container 100 is exposed to light, combinations thereof, or the like. Thus, the some embodiments of the concepts and technologies described herein can support extended battery life and/or can support embodiments that operate without batteries. It should be understood that these examples are illustrative and therefore should not be construed as being limiting in any way.

According to some contemplated embodiments of the concepts and technologies described herein, the illuminated liquid container 100 and/or a portion thereof (e.g., the cap 108) can include a wireless networking device such as a WiFi transceiver, a Bluetooth transceiver, or the like (labeled 710 in FIG. 7). The illuminated liquid container 100 also can include a microprocessor, logic circuit, and/or other structures (e.g., the controller 700) that can perform various operations. In one contemplated embodiment, the illuminated liquid container 100 can communicate, using the wireless networking device, with other devices or entities when the illuminated liquid container 100 is used. Thus, for example, the illuminated liquid container 100 can be used to generate a message, alert, notification, or other communication when the illuminated liquid container 100 is used. For example, if the illuminated liquid container 100 contains an automotive fluid such as motor oil, transmission fluid, fluid stabilizer, brake fluid, or the like, the illuminated liquid container 100 can detect, via the microprocessor, logic circuit, or the like, that the illuminated liquid container 100 has been opened and/or used. The illuminated liquid container 100 can generate a social networking update and send the social networking update via the wireless networking device. In one contemplated embodiment, the social networking update can read, for example, "I just fixed my car," or "I just added motor oil to my car," etc. It should be understood that this example is illustrative and therefore should not be construed as being limiting in any way.

In another contemplated embodiment, the illuminated liquid container 100 contains a personal lubricant or other fluid that may be used during intercourse. Thus, uses of the illuminated liquid container 100 can be tracked to track activities of a couple in attempting to conceive, for example. Thus, use of the illuminated liquid container 100 can be used as part of treatment for infertility, during marriage counseling, or the like. Tracking activity may be helpful in detecting trends, increasing the odds of conception (e.g., in combination with other methods for forecasting ovulation), or the like. It should be understood that this example embodiment is illustrative and therefore should not be construed as being limiting in any way.

The tracking also can be used for compliance tracking, in some embodiments. Thus, for example, if the illuminated liquid container 100 contains a medication, the use of the illuminated liquid container 100 can indicate that the patient has taken or used the medication. This information can be used by healthcare personnel or other entities to determine compliance with a prescribed treatment and/or regimen. It should be understood that this example is illustrative and therefore should not be construed as being limiting in any way.

The tracking also can be used for billing. For example, if the illuminated liquid container 100 contains an ointment, medication, or the like, the use of the illuminated liquid container 100 can be a billable event at a hospital or other healthcare facility. Similarly, if the illuminated liquid container 100 contains vehicle lubricants or additives (or the like), the use of the illuminated liquid container 100 can be a billable event at a mechanic's shop, garage, or the like. Thus, use of the illuminated liquid container 100 can prompt an alert, notification, or other communication that can be used to generate a bill or invoice (or billing event). In a hospital, for example, use of the illuminated liquid container 100 may be logged and billed to a patient. It should be understood that this example is illustrative and therefore should not be construed as being limiting in any way.

The ability to detect use of the illuminated liquid container 100 can be used for other purposes. For example, after a specified number of uses (which can be tracked not only by activation of the light source 114, but also via orientation of the illuminated liquid container 100 or the like), the illuminated liquid container 100 can trigger a purchase of another illuminated liquid container 100, a new power source (e.g., a battery), refilling of the illuminated liquid container 100, or the like. It should be understood that these examples are illustrative and therefore should not be construed as being limiting in any way.

In one contemplated embodiment of the concepts and technologies described herein, the illuminated liquid container 100 can be used in hospitals. In one specific embodiment, the illuminated liquid container 100 can be used at night by doctors, nurses, technicians, or the like to apply liquids and/or other fluids without requiring another light source (e.g., an overhead light, a flashlight, or the like). Thus, for example, healthcare personnel may use an embodiment of the illuminated liquid container 100 to dispense oral medications, ointments, anesthetics, and/or other fluids to children without turning lights on and/or interfering with a patient's sleep. It should be understood that this example is illustrative and therefore should not be construed as being limiting in any way.

In yet another contemplated embodiment, the illuminated liquid container 100 can correspond to a baby bottle that can be illuminated in low light conditions to facilitate feedings. Thus, for example, the light source 114 can be activated to provide light at or near a nipple, which can be one embodiment of the cap 108. Such an embodiment can be used to minimize interruptions to parents' and/or a baby's sleep during feedings. It should be understood that these examples are illustrative and therefore should not be construed as being limiting in any way.

Based on the foregoing, it should be appreciated that embodiments of an illuminated liquid container have been disclosed herein. Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

The invention claimed is:

1. A liquid container cap that is configured to connect to a bottle, the liquid container cap comprising:
   a first end and a second end, the first end comprising a rocker dispensing structure comprising a passageway that is configured to channel a liquid from the bottle and toward a surface that is outside of the bottle and outside of the cap, wherein the cap is configured to engage a portion of the bottle via connection mechanisms located at the second end, wherein the rocker dispensing structure is pivotally attached to the cap, and wherein opening the rocker dispensing structure unseals the bottle;
   a light source that is located at the first end, wherein the light source, when activated, emits light directed away from the second end and toward the surface to illuminate the surface to which the liquid is applied;
   a switch that is selectable to activate the light source; and
   a battery that provides an electrical charge to the light source.

2. The liquid container cap of claim 1, further comprising a timing device that is configured to deactivate the light source after a predetermined time passes after the light source is activated.

3. The liquid container cap of claim 1, further comprising a wireless networking device that is used to provide a notification when the liquid container cap is used.

4. The liquid container cap of claim 3, wherein the notification is used to generate a social networking update.

5. The liquid container cap of claim 3, wherein the notification is used for compliance tracking.

6. The liquid container cap of claim 3, wherein the notification is used for billing.

7. The liquid container cap of claim 1, further comprising a wireless networking device that is used to provide a notification when the liquid container cap is used.

8. The liquid container cap of claim 7, wherein the notification is used to generate a social networking update.

9. The liquid container cap of claim 7, wherein the notification is used for compliance tracking.

10. The liquid container cap of claim 7, wherein the notification is used for billing for use of the liquid.

11. A liquid container cap that is configured to engage a bottle, the liquid container cap comprising:
    a first end comprising a connection mechanism that is configured to engage a portion of the bottle;
    a second end comprising a rocker dispensing structure comprising a passageway that is configured to channel a liquid from the bottle and toward a surface that is outside of the bottle and outside of the cap, wherein opening the passageway unseals the bottle;
    a light source that is located at the first end, wherein the light source, when activated, is configured to emit light directed away from the second end and toward the surface that is outside of the bottle and outside of the cap;
    a switch that is selectable to activate the light source; and
    a battery that provides an electrical charge to the light source.

12. The liquid container cap of claim 11, further comprising a timing device that is configured to deactivate the light source after a predetermined time passes after the light source is activated.

13. A liquid container cap configured to provide a seal for a bottle, the liquid container cap comprising:
    a first end comprising a bottle connection mechanism;
    a second end comprising a rocker dispensing structure comprising a passageway configured to channel a liquid from the bottle toward a surface that is outside of the bottle and outside of the liquid container cap, wherein opening the passageway unseals the bottle;
    a light source that is located at the first end, wherein the light source is configured to emit light directed away from the second end and to the surface to illuminate the surface; and
    a switch that activates the light source.

14. The liquid container cap of claim 13, further comprising a photocell that is configured to deactivate the light source unless a low light condition is detected at the liquid container cap.

15. The liquid container cap of claim 13, further comprising a battery that provides an electrical charge to the light source.

16. The liquid container cap of claim 13, further comprising a relay that is configured to deactivate the light source after a predefined time period passes after the light source is activated.

17. The liquid container cap of claim 13, further comprising a timer that is configured to deactivate the light source after a predefined time period passes after the light source is activated.

18. The liquid container cap of claim 13, further comprising an orientation sensor that is configured to activate the light source when the liquid container cap is oriented in an application position and to deactivate the light source when the liquid container cap is not oriented in the application position.

19. The liquid container cap of claim 13, further comprising a wireless networking device that is used to provide a notification when the liquid container cap is used.

20. The liquid container cap of claim 19, wherein the notification is used to track use of the liquid container cap.

* * * * *